3,264,341
Patented August 2, 1966

3,264,341
PREPARATION OF DICYANOETHYLATED FATTY AMINES
Murray C. Cooperman, Chicago, Ill., assignor to Armour and Company, Chicago, Ill., a corporation of Delaware
No Drawing. Filed July 3, 1961, Ser. No. 121,326
7 Claims. (Cl. 260—465.5)

This invention relates to the preparation of dicyanoethylated fatty amines, which are useful as antistats in transparent plastic sheets, as intermediates for preparing triamines, quaternary ammonium compounds, and other surface active derivatives for use as corrosion inhibitors, asphalt additives, ore floatation reagents, bactericides, etc.

Attempts heretofore to prepare dicyanoethylated fatty amines in other than poor yields have been unsuccessful. Generally, acrylonitrile polymerization products are obtained with little or no reaction with the second aminoproton. Apparently, stearic hinderance must be overcome to effect reaction, and this problem has not been solved so as to produce a commercial or satisfactory yield.

I have discovered that dicyanoethylated fatty amines can be prepared with high yields exceeding 90%, while at the same time avoiding polymerization, through the use of process steps which will be set out in detail hereinafter.

A primary object, therefore, of the present invention is to provide a process by which dicyanoethylated fatty amines can be produced with high commercial yields. Another object is to convert primary amines to a dicyanoethylated compound in high yields in a routine and reliable manner. A further object is to provide a new and inexpensive method and means for the preparation of dicyanoethylated fatty amines in a two-stage process involving realtively low cost and producing high yields. Other specific objects and advantages will appear as the specification proceeds.

In one embodiment of the invention, a primary fatty amine is heated with an excess of acrylonitrile in the presence of a proton transfer agent and to reaction temperatures. After the reaction is completed, it is found that the dicyanoethylated fatty amine product has a yield in excess of 90%.

The primary fatty amine is preferably a high molecular weight aliphatic amine and is preferably derived from tallow, soybean oil, coconut oil, fish oil, rapeseed oil, etc. and which has from 8 to 22 carbon atoms.

The proton transferring catalyst may be water or a slightly basic material such as morpholine. I prefer to employ morpholine in combination with a trace of water for giving the better yields. It will be understood, however, that other catalysts having the property of transferring the proton may be employed.

The preferred proportions of the water and morpholine compound are 1.0 to 10.0% of morpholine, and 1.0 to 10.0% water, the optimum being approximately 4.0–6.0% water and 1.0–2.0% morpholine.

The temperatures may vary from 100–190° C. and preferably within the range of 150–180° C. I further prefer to carry out the reaction in a closed pressure vessel in which the pressure is between 100 and 200 p.s.i., with stirring through at least a portion of the operation.

The reaction may be effected in a two-stage process. The first, or monocyanoethylated stage, is effected by maintaining the process at 100–130° C. for about one hour, and the final state is effected at temperatures of 135–180° C. over about 15–40 hours. Production of substantial quantities of dicyanoethylated fatty amines may be effected by maintaining the second stage for times of about three hours. The preferred operation is to heat for one hour at 115° C. and 15–25 hours at 145–165° C. with sufficient stirring in a leak-proof pressure vessel.

While I have described the preferred operation as including the use of morpholine and water together in a reaction process, the operation can be carried on with water alone, as will be shown in some of the examples hereinafter, and also morpholine may be used alone as the proton-transferring catalyst. Methanol, also, for example, may be used to catalyze the dicyanoethylation process.

The following mechanism may be employed for the use of a proton-transfer catalyst:

(a)
$$R-\overset{H}{\underset{H}{\overset{..}{N}}}: + H:\overset{..}{\overset{..}{O}}:H \longrightarrow R-\overset{H-}{\overset{..}{N}}: + H:\overset{H+}{\overset{..}{O}}:H$$

(b)
$$\overset{+}{C}H_2-\overset{-}{C}HC\equiv N + H:\overset{H+}{\overset{..}{O}}:H \longrightarrow {}^+CH_2-CH_2-C\equiv N + H_2HO$$

(c)
$$R-\overset{H-}{\overset{..}{N}}: + \overset{+}{C}H_2-CH_2-C\equiv N \longrightarrow RNHCH_2CH_2C\equiv N$$

(d)
$$R-\overset{H}{\underset{..}{N}}-CH_2CH_2C\equiv N + H:\overset{..}{\overset{..}{O}}:H \longrightarrow$$
$$R-\overset{-}{\overset{..}{N}}-CH_2CH_2C\equiv N + H_3O^+$$

(e)
$$^+CH_2-\overset{-}{C}HC\equiv N + H_3O^+ \longrightarrow \overset{+}{C}H_2-CH_2-C\equiv N + H_2O$$

(f)
$$R-\overset{+}{\overset{..}{N}}-CH_2CH_2C\equiv H + \overset{+}{C}H_2CH_2C\equiv N \longrightarrow R-\overset{..}{\overset{..}{N}}-CH_2CH_2C\equiv N$$
$$\qquad\qquad\qquad\qquad\qquad\qquad\qquad\qquad |$$
$$\qquad\qquad\qquad\qquad\qquad\qquad\qquad\qquad CH_2CH_2C\equiv N$$

Any catalyst similar to water with a free electron pair would catalyze a similar type of mechanism. Low molecular weight alcohols should be more effective than higher alcohols which should give steric effects.

Specific examples of the process may be set out as follows:

*Example I*

A 2,000 ml. Parr pressure bomb is charged with 500 gms. distilled Armeen C (distilled coco primary amine), (2.5 moles), 50 gms. water, 12.5 gms. morpholine, and 318 gms. acrylonitrile (6 moles). The bomb is quickly sealed. (The initial monocyanoethylation reaction is rapid and exothermic, and losses of acrylonitrile by evaporation are to be avoided.) The reaction is stirred and heated at 110–115° C. for one hour. (Outside heating is necessary—pressure gauge reads 35–40 p.s.i. Most of the monocyanoethylation step is effected under these conditions.) Then the heat is raised to 145° C. and the reaction mixture is stirred for 17 hours (pressure gauge reads 90–100 p.s.i.). A sample is checked by potentiometric titration with perchloric acid, after first removing water and unreacted acrylonitrile. Then the reactor is cooled to 30° C. The excess water and acrylonitrile are removed by heating at 80° C. under a vacuum of 30 mm. for 2 hours. The final yield consisted of 760 gms. of a light amber liquid. Analysis showed 95.0% tertiary amine as the bis-(2-cyanoethyl) Armeen C, and 6.78% secondary amine as the 2-cyanoethyl Armeen C. The NE was 297 (theoretical NE=306). The recovery of product is quantitative. Sstructure has also been confirmed by infrared spectrum. A typically strong absorption peak is obtained at 4.5 microns for the C≡N group.

*Example II*

The process was carried out as described in Example I. The charge consisted of 530 gms. distilled Armeen S (distilled soya primary amine) (2 moles), 40 gms. water, 10 gms. morpholine and 318 gms. acrylonitrile (6 moles). Heat was maintained at 115–125° C. for one hour (gauge at 50–50 p.s.i.). Reaction was halted after 19 hours at 140–160° C. (gauge reads 90–180 p.s.i.). The material was dried as previously described. The recovery was quantitative. Final analysis of the amber semi-solid product showed 92.3% bis-(2-cyanoethyl) Armeen S and 5.86% of the monocyanoethylated compound. The N.E. was 370 (theoretical NE=374). Structure again was confirmed by a strong infrared absorption band at 4.5 microns.

*Example III*

The process was carried out as described in Example I. 266 gms. distilled Armeen T (distilled tallow primary amine) (1 mole), 20 gms. water, 5 gms. morpholine and 133 gms. acrylontrile (2.5 moles) were reacted for one hour in a 1.00 ml. Parr autoclave at 115° C. followed by 15½ hours at 150° C. The final dried material of quantitative yield was a nearly white solid with a little yellow liquid. Final analysis showed 91.1% dicyanoethylated compound and 8.74% of the monocyanoethylated compound. Structure was confirmed by infrared. The NE was 366 as compared to theory at 368.

*Example IV*

The following experiments were carried out following the procedure generally described in Example I, with the results indicated.

While, in the foregoing specification, I have set forth specific examples and procedures in considerable detail for the purpose of illustrating embodiments of the invention, it will be understood that such details may be varied widely by those skilled in the art without departing from the spirit of my invention.

I claim:

1. In a process for the preparation of dicyanoethyl fatty amines, wherein said fatty group contains from 8 to 22 carbon atoms, in which primary fatty amines containing from 8 to 22 carbon atoms are dicyanoethylated; the improvement of forming said dicyanoethyl amine by heating at autogenous pressure a primary fatty amine containing from 8 to 22 carbon atoms with an excess of the stoichiometric amount of acrylonitrile and a proton transfer catalyst selected from the group consisting of water, methanol, morpholine, and mixtures thereof, said proton transfer catalyst being present in from 1 to 10 percent by weight based on the total weight of the reactants, and said heating being carried out in two stages, the first stage of maintaining temperatures of about 100° to 130° C. for about 1 hour and the second stage of maintaining temperatures of about 135° to 180° C. for about 3 to 40 hours.

2. The process of claim 1 wherein said autogenous pressure developed during said second stage is between 100 and 200 p.s.i.

3. The process of claim 1 wherein said proton transfer catalyst is water.

TABLE I.—REACTION CONDITIONS AND RESULTS FOR BISCYANOETHYLATION OF ALKY LAMINE

| Run No. | Amine Type | g. | Acrylonitrile, g. | Water, g. | Morpholine, g. | Temp., °C. | Reaction time, hours | Percent Conversion to biscyanoethyl amine |
|---|---|---|---|---|---|---|---|---|
| 17 | Tallow | 266 | 159 | 20 | 5 | 120–155 | 28½ | 95.0 |
| 18 | do | 266 | 133 | 20 | 5 | 115–150 | 19½ | 91.1 |
| 19 | do | 1,064 | 635 | 80 | 20 | 115–165 | 46 | 92.7 |
| 20 | do | 275 | 212 | 18 | | 115–150 | 15½ | 96.4 |
| 21 | do | 275 | 133 | 36 | | 115–150 | 22 | 90.4 |
| 1 | Soybean | 530 | 318 | 40 | 10 | 115–160 | 20 | 92.3 |
| 5 | Coco | 500 | 318 | 50 | 12.5 | 115–145 | 18 | 95.0 |
| 3 | Tallow | 275 | 159 | | | 120–160 | 57 | 68.9 |
| 6 | do | 269 | 159 | 1 | | 160 | 24 | 59.4 |
| | Coco | 300 | 212 | *30 | | 140–160 | 30 | 88.5 |

* Methanol.

*Example V*

300 gms. of distilled coco amines (1.5 moles), 30 gms. methanol and 212 gms. acrylonitrile (4 moles) are mixed in a 1,000 ml. magna dash autoclave. The contents are stirred and heated to 115–120° C. for 1 hour (autogenous pressure is 80 p.s.i.). Then it is stirred and heated to 140–160° C. and 150 p.s.i. (autogenous pressure). After 3 hours, the pressure fell to 100 p.s.i. A sample at this point showed no unreacted primary amine, 59.4% monocyanoethylated product, and 40.6% dicyanoethylated amine. After 27½ hours' reaction time, the dicyanoethylated product reached a maximum of 87–88% with 12% secondary amine as the monocyanoethylated intermediate. The batch was cooled and dried at 80° C. under 50 mm. vacuum to yield 16 oz. of an amber liquid. The analytical results are tabulated.

| Sample | Reaction time (hrs.) | Temperature, °C. | Autogenous press. | Analysis |
|---|---|---|---|---|
| (a) | 3 | 140–160 | 100# | 40.6% dicyanoethylated amine, 59.4% monocyanoethylated amine. |
| (b) | 23 | 140–160 | 100# | 83.54% dicyano product, 15.84% monocyano product. |
| (c) | 27½ | 140–160 | 100# | 87.08% dicyano product, 12.92% monocyano product. |
| (d) | 30 | 140–160 | 100# | 88.46% dicyano product, 9.88% monocyano product. |

4. The process of claim 1 wherein about 4 to 6 percent water and about 1 to 2 percent morpholine is present.

5. The process of claim 1 wherein the temperature during said second stage is from about 145° to 165° C.

6. The process of claim 1 wherein the amount of acrylonitrile is about 20 mole percent in excess of the stoichiometric amount.

7. The process of claim 1 wherein said second stage is maintained for about 15 to 40 hours.

References Cited by the Examiner

UNITED STATES PATENTS

| 2,787,633 | 4/1957 | Harrison et al. | 260—465.5 |
| 2,982,781 | 5/1961 | Montgomery | 260—465.5 |
| 3,028,415 | 4/1962 | Nordgren | 260—465.5 |
| 3,158,643 | 11/1964 | Fulmer | 260—465.5 |

OTHER REFERENCES

Bruson, "Organic Reactions," vol. 5, 1949, pages 82, 84 and 89.

Markley, "Fatty Acids," 1947, pages 20–21.

CHARLES B. PARKER, *Primary Examiner.*

J. B. BRUST, *Assistant Examiner.*